United States Patent
Boshra

(10) Patent No.: US 9,514,351 B2
(45) Date of Patent: Dec. 6, 2016

(54) PROCESSING A FINGERPRINT FOR FINGERPRINT MATCHING

(71) Applicant: Apple Inc., Cupertino, CA (US)

(72) Inventor: Michael Boshra, Rockledge, FL (US)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 14/179,537

(22) Filed: Feb. 12, 2014

(65) Prior Publication Data
US 2015/0278574 A1    Oct. 1, 2015

(51) Int. Cl.
*G06K 9/00*    (2006.01)

(52) U.S. Cl.
CPC .................. *G06K 9/0008* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,208,651 A | * | 6/1980 | McMahon ......... | G06K 9/00067 382/125 |
| 5,659,626 A | * | 8/1997 | Ort ..................... | G06K 9/00067 382/125 |
| 5,799,098 A | * | 8/1998 | Ort ..................... | G06K 9/00067 382/125 |
| 5,926,555 A | * | 7/1999 | Ort ..................... | G06K 9/00067 382/124 |
| 5,982,914 A | | 11/1999 | Lee et al. | |
| 5,999,098 A | * | 12/1999 | Lian .................... | G08B 13/244 340/551 |
| 6,289,114 B1 | | 9/2001 | Mainguet | |
| 6,323,846 B1 | | 11/2001 | Westerman et al. | |

(Continued)

FOREIGN PATENT DOCUMENTS

CN    101079087    3/2005
EP    1302907    4/2003

(Continued)

OTHER PUBLICATIONS

Cappelli, "SFinGe: an Approach to Synthetic Fingerprint Generation," DEIS, University of Bologna, Italy, 2004.

(Continued)

*Primary Examiner* — Anand Bhatnagar
(74) *Attorney, Agent, or Firm* — Brownstein Hyatt Farber Schreck, LLP

(57) ABSTRACT

Processing a fingerprint can include determining one or more optimal weights based on ridge flow angles or ridge flow angle differences. Determination of the optimal weight (s) can be based on predicting a ridge flow angle for each cell in a ridge flow map using one or more neighboring cells. The optimal weights may be estimated so as to minimize error between the predicted and actual ridge flow angles. Alternatively, the optimal weight(s) may be determined using a predicted ridge flow angle difference for each cell in a difference map that is based on an actual ridge flow angle difference for one or more neighboring cells. The optimal weights can be estimated to minimize the error between predicted and actual angle differences. Additionally, a correlation penalty may be determined based on an extent of spatial correlation in the ridge flow angle differences in the difference map.

17 Claims, 7 Drawing Sheets

(56) References Cited

U.S. PATENT DOCUMENTS

| | | |
|---|---|---|
| 6,546,122 B1 | 4/2003 | Russo |
| 6,570,557 B1 | 5/2003 | Westerman et al. |
| 6,677,932 B1 | 1/2004 | Westerman |
| 6,795,569 B1 | 9/2004 | Setlak |
| 6,888,536 B2 | 5/2005 | Westerman et al. |
| 6,898,301 B2 | 5/2005 | Iwanaga |
| 6,950,540 B2 | 9/2005 | Higuchi |
| 6,961,452 B2 | 11/2005 | Fujii |
| 7,103,200 B2 | 9/2006 | Hillhouse |
| 7,194,116 B2 | 3/2007 | Du et al. |
| 7,194,393 B2 * | 3/2007 | Wei .................. G06K 9/00885 382/190 |
| 7,280,677 B2 | 10/2007 | Chandler et al. |
| 7,372,979 B2 | 5/2008 | Hillhouse |
| 7,512,571 B2 * | 3/2009 | Rudolf ................ G06K 9/6247 706/12 |
| 7,549,161 B2 | 6/2009 | Poo et al. |
| 7,599,530 B2 * | 10/2009 | Boshra ............... G06K 9/00087 382/124 |
| 7,616,787 B2 * | 11/2009 | Boshra ............... G06K 9/00026 382/124 |
| 7,693,314 B2 | 4/2010 | Tykowski et al. |
| 8,131,026 B2 | 3/2012 | Benkley et al. |
| 8,255,699 B2 | 8/2012 | Tagscherer |
| 8,295,561 B2 | 10/2012 | Kwan |
| 8,296,573 B2 | 10/2012 | Bolle |
| 8,358,815 B2 | 1/2013 | Benkley et al. |
| 8,482,381 B2 | 7/2013 | Chatterjee et al. |
| 8,605,960 B2 * | 12/2013 | Orsley ................. G06F 3/0421 382/124 |
| 8,611,618 B2 | 12/2013 | Kwon et al. |
| 8,736,421 B2 | 5/2014 | Abe |
| 8,796,881 B2 | 8/2014 | Davis |
| 8,824,749 B2 | 9/2014 | Leyvand et al. |
| 8,913,802 B2 | 12/2014 | Han et al. |
| 2004/0146186 A1 | 7/2004 | Gelbord et al. |
| 2005/0117785 A1 * | 6/2005 | Boshra ............... G06K 9/00087 382/124 |
| 2007/0036400 A1 * | 2/2007 | Watanabe ............ G06K 9/6857 382/124 |
| 2007/0263912 A1 | 11/2007 | Biarnes et al. |
| 2008/0155269 A1 | 6/2008 | Yoshikawa |
| 2010/0182123 A1 | 7/2010 | Press |
| 2011/0044513 A1 | 2/2011 | McGonagle et al. |
| 2013/0064434 A1 | 3/2013 | Riopka et al. |
| 2013/0207779 A1 | 8/2013 | Uno et al. |
| 2013/0259330 A1 | 10/2013 | Russo et al. |
| 2013/0278383 A1 | 10/2013 | Boshra |
| 2013/0279768 A1 | 10/2013 | Boshra |
| 2013/0332354 A1 | 12/2013 | Rhee et al. |
| 2014/0003678 A1 | 1/2014 | Vieta et al. |
| 2014/0003679 A1 | 1/2014 | Han et al. |
| 2014/0003681 A1 | 1/2014 | Wright et al. |
| 2015/0139512 A1 | 5/2015 | Han et al. |
| 2015/0227740 A1 | 8/2015 | Boshra et al. |
| 2015/0349959 A1 | 12/2015 | Marciniak |

FOREIGN PATENT DOCUMENTS

| | | |
|---|---|---|
| EP | 1519326 | 3/2005 |
| EP | 1533759 | 5/2005 |
| TW | 201120763 | 6/2011 |

OTHER PUBLICATIONS

Nasser et al., "User Interface Design of the Interactive Fingerprint Recognition (INFIR) System," Proceedings of the 2006 International Conference on Security & Management, SAM 2006, Jun. 26, 2009, pp. 371-377, XP055084842, retrieved from the Internet on Oct. 22, 2013: URL:http://wwl.ucmss.com/books/LFS/CSREA2006/SAM8023.pdf.

Riley et al., "Instruction, Feedback and Biometrics: The User Interface for Fingerprint Authentication Systems," Human-Computer Interaction A Interact, 2009, Springer Berlin Heidelberg, pp. 293-305, XP019126310, ISBN: 978-3-642-03657-6.

Uz et al., "Minutiae-Based Template Synthesis and Matching Using Hierarchical Delaunay Triangulations," *Biometrics: Theory, Applications, and Systems*, 2007, First IEEE International Conference, Sep. 1, 2007, pp. 1-8, XP031189988, ISBN: 978-1-4244-1596-0, Section II, IV, V.

Anonymous, "WordPress › Limit Login Attempts < WordPress Plugins," Apr. 19, 2014, XP055202312, Retrieved from the Internet: URL:https://web.archive.org/web/20140419102326/http://wordpress.org/plugins/limit-login-attempts/screenshots/ [retrieved on Jul. 14, 2015], 3 pages.

Söderlund, "How do I best tell a user that his/her account will be locked if they enter the wrong credentials too many times?", Jul. 30, 2013, XP055202317, Retrieved from the Internet: URL:https://web.archive.org/web/20130730052456/http://us.stackexchange.com/questions/25621/how-do-i-best-tell-a-user-that-his-her-account-will-be-locked-if-they-enter-the [retrieved on Jul. 14, 2015], 3 pages.

Ryu et al., "Template Adaptation based Fingerprint Verification," Pattern Recognition, 2006, ICPR 2006, 18th International Conference on vol. 4, IEEE, 2006, 4 pages.

U.S. Appl. No. 13/802,645, filed Mar. 13, 2013, Vieta et al.
U.S. Appl. No. 13/802,695, filed Mar. 13, 2013, Han et al.
U.S. Appl. No. 13/841,287, filed Mar. 15, 2013, Wright et a.
U.S. Appl. No. 14/180,334, filed Feb. 13, 2014, Boshra et al.
U.S. Appl. No. 14/723,298, filed May 27, 2015, Marciniak.
U.S. Appl. No. 14/243,858, filed Apr. 2, 2014, Han et al.

* cited by examiner

PROCESSING A FINGERPRINT FOR FINGERPRINT MATCHING

TECHNICAL FIELD

The present invention relates generally to a fingerprint recognition device, and more particularly to processing a fingerprint for fingerprint matching.

BACKGROUND

Biometric data generally holds a wealth of unique identifying information that may be used in a variety of different ways, with security applications being a common use of biometric data. This is due, in part, to the fact that biometric data is not easily counterfeited and is uniquely associated with a person. Fingerprint and retina recognition devices, for example, are relatively common biometric data recognition devices that are used to collect biometric data for security purposes.

A common approach to fingerprint matching involves scanning a sample fingerprint or an image thereof and generating a ridge flow map for the fingerprint. Construction of the ridge flow map can include determining, for each cell in the ridge flow map, an angle of the ridge flow orientation. For example, in some instances the ridge flow orientation can be determined with respect to a horizontal axis. Some methods for matching fingerprints can require an estimation of the information content (entropy) of the ridge flow maps. A fingerprint match can be erroneous if the error in the entropy estimation is too great.

In other situations, pattern changes in a fingerprint may introduce correlated changes in the fingerprint, which can cause the ridge flow angle differences to become correlated. For example, the skin on a finger may become drier over time, and this increased dryness differences can result in a change in the fingerprint pattern. The correlated ridge flow angle differences can increase the probability that a fingerprint matching operation will fail.

SUMMARY

In one aspect, an electronic device can include a fingerprint recognition device for capturing a fingerprint image and a processing device operatively connected to the fingerprint recognition device. The processing device may be adapted to dynamically (i.e., on the fly) determine one or more optimal weights for a difference map or a ridge flow map associated with the captured fingerprint image. The one or more optimal weights are based on data in one or more neighboring cells of the difference map or the ridge flow map.

In another aspect, a method for processing a fingerprint captured by a fingerprint recognition device can include generating a ridge flow map based on a captured fingerprint image, and determining one or more optimal weights for the ridge flow map by predicting a ridge flow angle for each cell in the ridge flow map using one or more neighboring cells. As one example, predicting a ridge flow angle for each cell in the ridge flow map can include raster scanning the ridge flow map, and at each cell, predicting a ridge flow angle for that cell using an actual ridge flow angle in one or more previously-scanned neighboring cells. The optimal weights used for prediction may be determined so as to minimize error between the predicted and actual ridge flow angles. In some embodiments, the prediction can be based on an autoregressive modeling of the ridge flow angles in the ridge flow map.

In another aspect, an electronic device can include a fingerprint recognition device for capturing a fingerprint image, and a processing device operatively connected to the fingerprint recognition device and adapted to determine one or more optimal weights for a ridge flow map associated with the captured image. The one or more optimal weights may be based on a prediction of a ridge flow angle for each cell in the ridge flow map using an actual ridge flow angle in one or more neighboring cells. As one example, predicting a ridge flow angle for each cell in the ridge flow map can include raster scanning the ridge flow map, and at each cell, predicting a ridge flow angle for that cell using an actual ridge flow angle in one or more previously-scanned neighboring cells. The optimal weights used for prediction may be determined so as to minimize error between the predicted and actual ridge flow angles. In some embodiments, the prediction can be based on an autoregressive modeling of the ridge flow angles in the ridge flow map.

In another aspect, an electronic device can include a fingerprint recognition device for capturing a fingerprint image, and a processing device operatively connected to the fingerprint recognition device and adapted to determine a difference map based on ridge flow angle differences between an enrolled ridge flow map and a captured ridge flow map associated with the captured fingerprint image. The processing device is adapted to determine one or more optimal weights for the difference map using a predicted ridge flow angle difference for each cell in the difference map that is based on an actual ridge flow angle difference for one or more neighboring cells. In one embodiment, the difference map is raster scanned and at each cell, a ridge flow angle difference for that cell is predicted using an actual ridge flow angle difference for one or more previously-scanned neighboring cells in the difference map. The optimal weights may be determined so as to minimize the least square error between the predicted difference and the actual difference. As one example, the processing device may be adapted to perform an autoregressive modeling of the ridge flow angle differences in the difference map. Additionally, the processing device can be adapted to determine a correlation penalty that is based on an extent of detected spatial correlation in the ridge flow angle differences in the difference map.

In yet another aspect, a method for processing a fingerprint captured by a fingerprint recognition device can include generating a captured ridge flow map for a captured fingerprint image and generating a difference map based on ridge flow angle differences between the captured ridge flow map and an enrolled ridge flow map. One or more optimal weights may be determined for the difference map by predicting a ridge flow angle difference for each cell in the difference map that is based on an actual ridge flow angle difference for one or more neighboring cells in the difference map. In one embodiment, predicting a ridge flow angle difference for each cell in the difference map can include raster scanning the difference map and at each cell, predicting a ridge flow angle difference for that cell using an actual ridge flow angle difference for one or more previously-scanned neighboring cells in the difference map. The optimal weights may be determined so as to minimize the least square error between the predicted difference and the actual difference. In some embodiments, the prediction can be based on an autoregressive modeling of the ridge flow angle differences in the difference map. Additionally, the processing device may be adapted to determine a correlation penalty that is based on an extent of detected spatial correlation in the ridge flow angle differences in the difference map.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein provide techniques for processing a fingerprint as part of a fingerprint matching operation. Fingerprint matching can involve scanning a sample fingerprint or an image thereof and generating a ridge flow (RF) map for the fingerprint. Construction of the ridge flow map can include determining, for each cell in the ridge flow map, an angle of the ridge flow orientation with respect to an axis, such as a horizontal axis. In some embodiments, the ridge flow angles are de-correlated by determining one or more optimal weights for a ridge flow map. As one example, the RF map may be raster scanned and, at each cell, a ridge flow angle can be predicted for that cell using an actual ridge flow angle in one or more previously-scanned neighboring cells. The optimal weights used for prediction may be estimated so as to minimize error between the predicted and actual ridge flow angles. In some embodiments, the prediction may be based on an autoregressive modeling of the ridge flow angles in the ridge flow map.

In another embodiment, one or more optimal weights may be determined for the difference map using a predicted ridge flow angle difference that is based on actual ridge flow angle differences. For example, a difference map may be raster scanned and, at each cell, a predicted ridge flow angle difference for that cell can be estimated based on an actual ridge flow angle difference for one or more neighboring cells in the difference map. The optimal weights may be estimated so as to minimize the least square error between the predicted difference and the actual difference. Additionally, a correlation penalty can be determined that is based on an extent of detected spatial correlation in the ridge flow angle differences in the difference map. The correlation penalty provides a tradeoff on how much spatial correlation can be tolerated in the matching process.

The term "node" generally refers to an individual portion, segment, or region of a representation of a fingerprint, or information representative thereof, such as might be collected by a fingerprint recognition device. The term "mosaic" generally refers to a partially unified representation of a fingerprint, or information representative thereof, collected from one or more nodes. The term "template" generally refers to multiple nodes and/or mosaics (or information representative thereof) that have been woven together and that have been validated as a fingerprint. For example, a template can be constructed from one or more mosaics, or a mosaic and one or more additional nodes.

Figure 1:
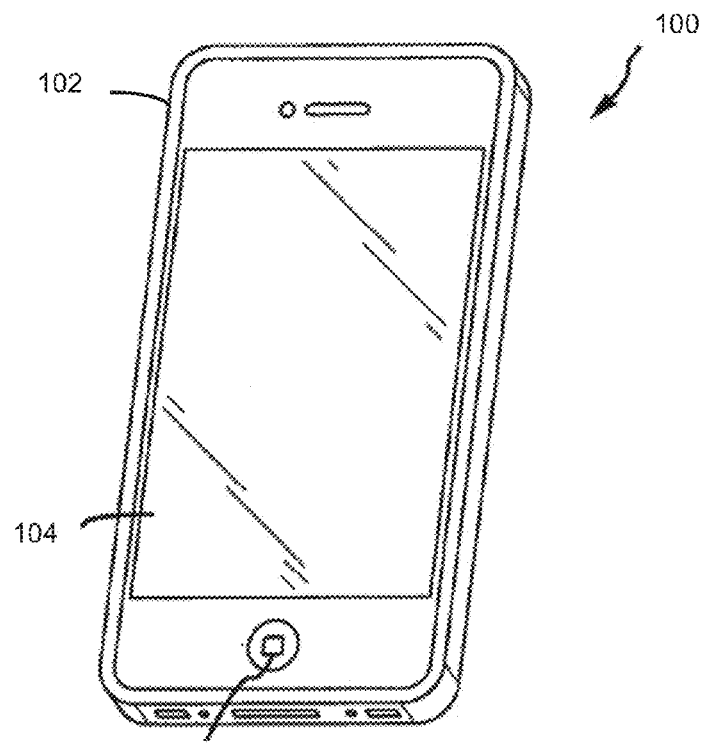
FIG. 1 is a perspective view of one example of an electronic device that can include, or be connected to, a biometric recognition system.

Referring now to FIG. 1, there is shown a perspective view of one example of an electronic device that can include, or be connected to a fingerprint recognition device. In the illustrated embodiment, the electronic device 100 is implemented as a smart telephone. Other embodiments can implement the electronic device differently, such as, for example, as a laptop or desktop computer, a tablet computing device, a gaming device, a display, a digital music player, a wearable communications device, a wearable health assistant, and other types of electronic devices that can acquire and/or receive fingerprint data from a fingerprint recognition device.

The electronic device 100 includes an enclosure 102 at least partially surrounding a display 104 and one or more buttons 106 or input devices. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. The button 106 can take the form of a home button, which may be a mechanical button, a soft button (e.g., a button that does not physically move but still accepts inputs), an icon or image on a display, and so on. Further, in some embodiments, the button 106 can be integrated as part of a cover glass of the electronic device.

One or more fingerprint recognition devices can be included in, or connected to the electronic device 100. In one embodiment, the button 106 can include a fingerprint sensor or recognition device. As one example, a fingerprint recognition device can be integrated in the button 106. Additionally or alternatively, a fingerprint recognition device can be included in a portion of the display, or in the entire display. And in some embodiments, the enclosure 102 can include one or more biometric recognition devices, such as a fingerprint sensor, a thermal sensor, and a microphone that can be used in conjunction with a voice recognition application.

Figure 2:
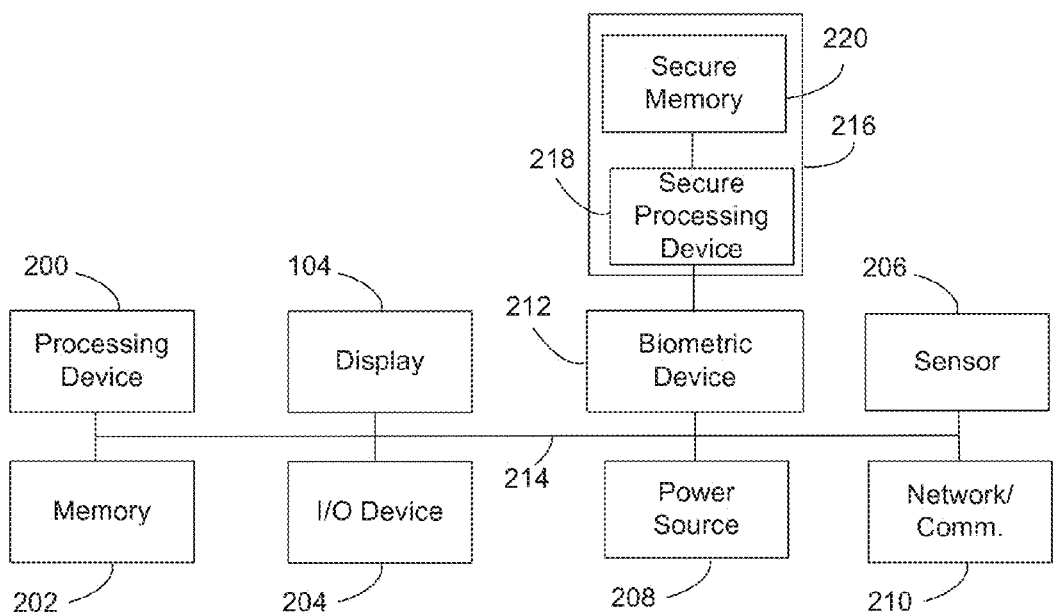
FIG. 2 is an illustrative block diagram of the electronic device 100 shown in FIG. 1.

FIG. 2 is an illustrative block diagram of the electronic device 100 shown in FIG. 1. The electronic device 100 can include the display 104, a processing device 200, memory 202, an input/output (I/O) device 204, a sensor 206, a power source 208, a network communications interface 210, and a fingerprint recognition device 212. The display 104 may provide an image or video output for the electronic device 100. The display may also provide an input region for one or more input devices, such as, for example, a touch sensing device and/or a fingerprint sensor. The display 104 may be substantially any size and may be positioned substantially anywhere on the electronic device 100.

The processing device 200 can control some or all of the operations of the electronic device 100. The processing device 200 can communicate, either directly or indirectly, with substantially all of the components of the electronic device 100. For example, a system bus or signal line 214 or other communication mechanisms can provide communication between the processing device 200, the memory 202, the I/O device 204, the sensor 206, the power source 208, the network communications interface 210, and/or the fingerprint recognition device 212. The processing device 200 can be implemented as any electronic device capable of processing, receiving, or transmitting data or instructions. For example, the processing device 200 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 202 can store electronic data that can be used by the electronic device 100. For example, a memory can store electrical data or content such as, for example, audio and video files, documents and applications, device settings and user preferences, timing signals, data structures or databases, and so on. The memory 202 can be configured as any type of memory. By way of example only, the memory can be implemented as random access memory, read-only memory, Flash memory, removable memory, or other types of storage elements, or combinations of such devices.

The I/O device 204 can transmit and/or receive data to and from a user or another electronic device. One example of an I/O device is button 106 in FIG. 1. The I/O device(s) 204 can include a display, a touch sensing input surface such as a trackpad, one or more buttons, one or more microphones or speakers, one or more ports such as a microphone port, and/or a keyboard.

The electronic device 100 may also include one or more sensors 206 positioned substantially anywhere on the electronic device 100. The sensor or sensors 206 may be configured to sense substantially any type of characteristic, such as but not limited to, images, pressure, light, touch, heat, movement, relative motion, and so on. For example, the sensor(s) 208 may be an image sensor, a heat sensor, a light or optical sensor, an accelerometer, a pressure transducer, a gyroscope, a magnet, and/or a health monitoring sensor.

The power source 208 can be implemented with any device capable of providing energy to the electronic device 100. For example, the power source 208 can be one or more batteries or rechargeable batteries, or a connection cable that connects the remote control device to another power source such as a wall outlet.

The network communication interface 210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

The fingerprint recognition device 212 can be implemented with any suitable sensing technology, including, but not limited to, capacitive, resistive, ultrasound, piezoelectric, and thermal sensing technology. In some embodiments, the fingerprint recognition device 212 can be connected to a secure processing system 216. The secure processing system can be included in the electronic device, in the fingerprint recognition device, or in a separate electronic device that is operatively connected to the fingerprint recognition device 212. The secure processing system 216 may include a secure processing device 218 and a secure memory 220 operatively connected to the secure processing device 218. Any suitable processing device and memory can be used in the secure processing system 216. And in some embodiments, other components can be included in the secure processing system.

The secure processing system 216 can receive fingerprint images captured by the fingerprint recognition device. The secure memory 220 may store the images, information associated with each image, and one or more templates. The secure processing device 218 can manipulate the secure data stored in the secure memory, including the fingerprint images, associated information, and templates. The processing device 200 can be prohibited from accessing the fingerprint images received from the fingerprint recognition device and the secure data stored in the secure memory 220, which increases the security of the secure data. For example, the secure data is inaccessible or less accessible to other programs that may be running on the processing device 200.

It should be noted that FIGS. 1 and 2 are illustrative only. In other examples, an electronic device may include fewer or more components than those shown in FIGS. 1 and 2. For example, some of the components shown in FIG. 2 can be implemented in a separate electronic device that is operatively connected to the electronic device 100 through a wired or wireless connection. As described earlier, the secure processing system can be included in a separate electronic device. Additionally or alternatively, in some embodiments the display or at least one I/O device can be included in a separate electronic device.

Figure 3:
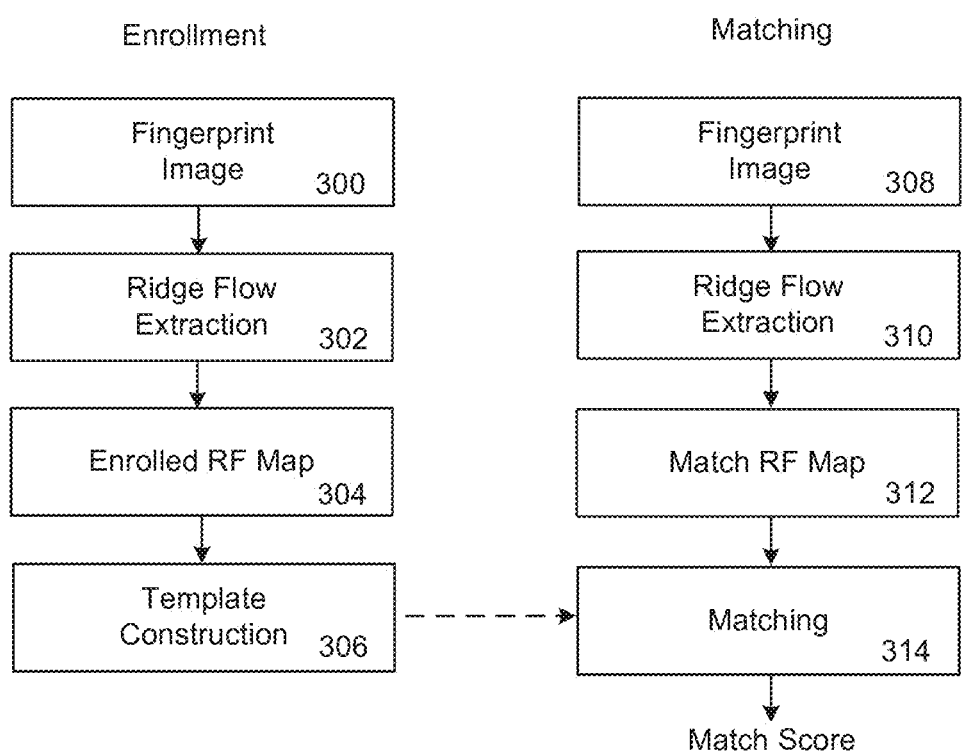
FIG. 3 is a flow diagram generally illustrating fingerprint enrollment and matching operations.

Referring now to FIG. 3, there is shown a flow diagram generally illustrating the enrollment and matching operations. In the enrollment stage, a user can place his or her finger on an input surface of a fingerprint recognition device (e.g., 212 in FIG. 2). A fingerprint image is acquired at block 300 and passed to a processing device (e.g., secure processing device 218), which extracts information on the ridges in the fingerprint image (block 302). The processing device constructs a ridge flow (RF) map or orientation map of the fingerprint image at block 304.

Figures 4, 5:
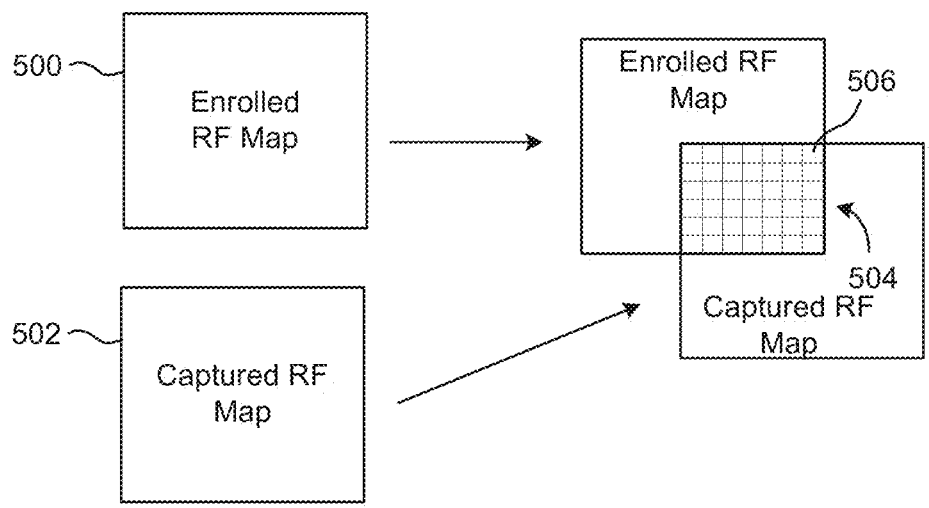
FIG. 4 illustrates a ridge flow map.
FIG. 5 depicts block 314 in FIG. 3.

FIG. 4 illustrates an RF map. Construction of the RF map 400 can include determining an angle of the ridge flow orientation with respect to an axis (e.g., the horizontal axis) for each cell 402 in the RF map. Thus, each value $O_{ij}$ in the RF map can include information on a ridge flow angle. Note that the letter i may represent a row number and j a column number in the RF map. In some embodiments, a special value may be assigned to a given cell if the ridge flow orientation cannot be estimated reliably for the cell.

Returning to FIG. 3, the resulting RF map ("enrolled RF map") can be included in a template for the fingerprint at block 306. The template may be stored in a memory or storage device, such as secure memory 220 in FIG. 2. In another embodiment, several fingerprint images may be acquired, and the above process may be repeated for each of these images. The "best" template is then selected using a criterion that can be based on measures of image quality, image content, and/or cross-match scores, as will be appreciated by those skilled in the art. And in some embodiments, multiple RF maps may be stored in a single template.

The matching process may begin with the user placing his or her finger on the input surface of the fingerprint recognition device to capture a new fingerprint image (block 308). This image is processed in a manner similar to that during the enrollment stage, where the processing device extracts information on the ridges in the image and constructs a RF map ("captured RF map") for the newly captured fingerprint image (blocks 310, 312). The captured RF map is passed to the processing device which compares it with one or more templates associated with the user (block 314). The output of the matching process is a match score that estimates the degree of similarity between the two RF maps.

FIG. 5 illustrates block 314 in FIG. 3. The enrolled RF map 500 and the captured RF map 502 are aligned with respect to each other when determining if the captured RF map 502 matches at least a part of the enrolled RF map 500. The captured RF map 502 can be compared by translating and/or rotating one RF map with respect to the other RF map to determine an area where the two RF maps match one another. In the illustrated embodiment, the captured RF map 502 matches the enrolled RF map in an overlap region 504, where the overlap region includes one or more cells 506.

Predicted Ridge Flow Angle Based on Actual Ridge Flow Angles

In some embodiments, the match score that results from the matching operation can be based on the information content in the enrolled and captured RF maps, and the difference between corresponding ridge flow angles in the enrolled and captured RF maps. The higher the entropy or information in the overlap region, the higher the match score. The greater the difference between corresponding ridge flow angles, the lower the match score. One method of a matching operation is disclosed in U.S. Pat. No. 7,599,530, which is incorporated herein by reference.

One issue in the estimation of the entropy for a ridge flow map is the weights used in predicting the ridge flow angles. The entropy is estimated from the residual map, which corresponds to the difference between predicted and actual ridge flow angles. Prior art involves using fixed weights determined off-line for prediction of ridge flow angles. In some situations, the optimal weights for prediction can vary considerably from fixed weights. The use of fixed weights in those situations can sometimes result in over-estimating the information content. This can artificially increase the match score S, which increases the probability that a fingerprint will be falsely accepted when identifying or verifying the identity of a user.

Figure 6:
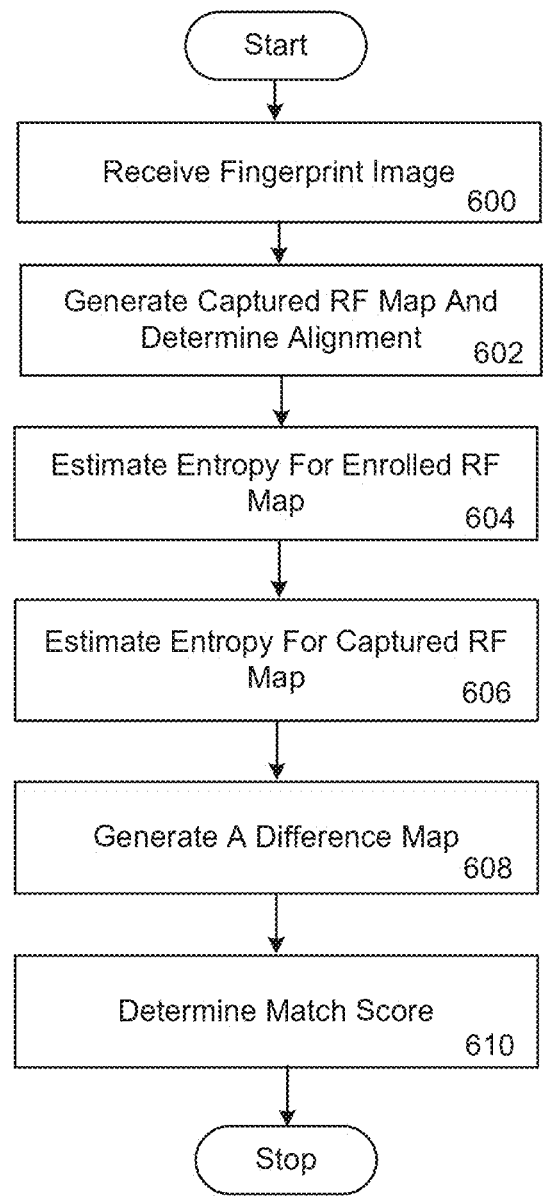
FIG. 6 is a flowchart of an example method for processing a fingerprint as part of a fingerprint matching operation.

Referring now to FIG. 6, there is shown a flowchart of an example method for processing a fingerprint as part of a fingerprint matching operation. Initially, a fingerprint image is received at block 600. A captured RF map is generated and an alignment between the captured RF map and one or more enrolled RF maps is determined (block 602). The information content or entropy in the enrolled RF map and the entropy in the captured RF map are then estimated at blocks 604 and 606. A difference map may be generated at block 608. A difference map can include the angle differences between the enrolled RF map and the captured RF map. A match score may then be determined at block 610 and the methods ends.

Figure 7:
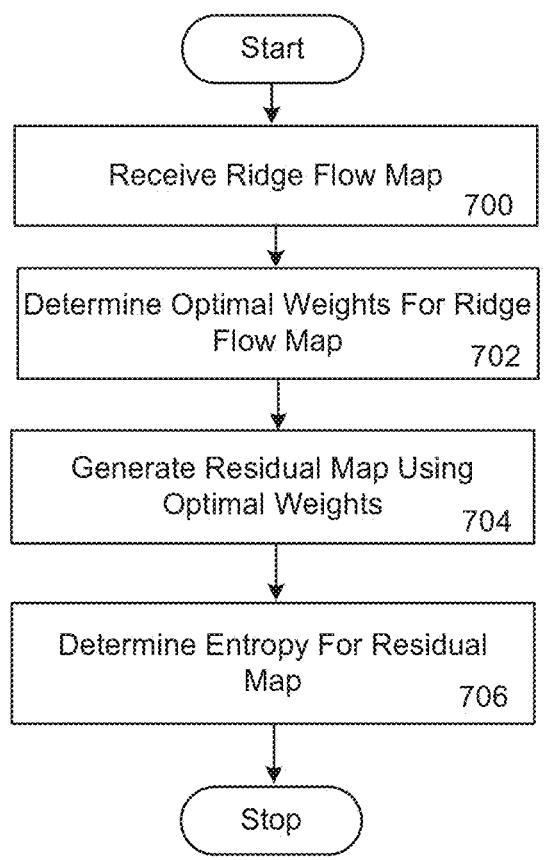
FIG. 7 is a flowchart of an example method for block 604 or 606 shown in FIG. 6.

FIG. 7 is a flowchart of an example method for block 604 or 606 shown in FIG. 6. Initially, a RF map is received at block 700. The RF map can be the enrolled RF map or the captured RF map. Optimal weights are then determined at block 702. The optimal weights can be estimated on the fly by raster scanning the RF map and predicting each angle in a cell of the RF map based on previously scanned neighboring cells. Determination of the optimal weights is based on minimizing the error between the actual angle of a ridge flow and the predicted angle of the ridge flow. For example, the optimal weights can be determined to minimize the least squares error between the actual and predicted angles.

As described earlier, in some embodiments determination of the optimal weights is performed using a linear autoregressive model. The prediction of the ridge flow angle for each cell in the RF map can be based on the equation $$P_{ij} = w_1 O_{i(j-1)} + w_2 O_{(i-1)(j-1)} + w_3 O_{(i-1)j} + w_4 O_{(i-1)(j+1)}, \quad \text{Equation 1}$$

where $w_1$, $w_2$, $w_3$, and $w_4$ represent the optimal weights and O represents the value associated with four neighboring cells. For example, if the predicted ridge flow angle is being determined for $O_{22}$ in FIG. 4, Equation 1 is $P_{22} = w_1 O_{21} + w_2 O_{11} + w_3 O_{12} + w_4 O_{13}$. Thus, the predicted angle for cell 22 considers the actual ridge flow angle in the immediately adjacent cell in the same row and the actual ridge flow angle in three cells in the immediately preceding row.

Equation 1 for the next raster scanned cell $O_{23}$ would be $P_{23} = w_1 O_{22} + w_2 O_{12} + w_3 O_{13} + w_4 O_{14}$. As discussed earlier, the weights $w_1$, $w_2$, $w_3$, and $w_4$ are determined such that the errors between the actual angles and the predicted angles in the RF map are minimized. Thus, $w_1$, $w_2$, $w_3$, and $w_4$ apply to an entire ridge flow map. Different ridge flow maps can have different weights $w_1$, $w_2$, $w_3$, and $w_4$. Optimal weights that are determined for each RF map can account for some or all of the spatial correlation and reduce or eliminate the effect of overestimating the information content.

Next, as shown in 704, a residual map is generated based on the differences between the actual and predicted angles using the one or more optimal weights. The entropy of the residual map may then be determined at block 706. The method ends after block 706.

Although Equation 1 includes the four neighboring cells, other embodiments are not limited to this implementation. Any number of previously-visited neighboring cells can be included in the analysis. Additionally or alternatively, the previously-visited neighboring cells do not have to be limited to adjacent cells (e.g., the same row and/or immediately preceding row). And in some embodiments, the optimal weights can be determined for two or more regions of a RF map rather than for the entire RF map. For example, a RF map can be divided into four regions and one or more optimal weights can be determined for each region.

Predicted Ridge Flow Angle Difference Based on Actual Ridge Flow Angle Differences Another issue that can adversely affect a match score is changes in one or more ridges of a fingerprint. A ridge in a fingerprint can change between the time the enrolled RF map is generated and the time a user inputs a fingerprint for matching. As one example, the skin on a finger can have a normal moisture level when the enrolled RF map is produced and a drier moisture level when a match fingerprint of the finger is acquired. Additionally or alternatively, a user can press a finger onto the input surface of a fingerprint recognition device with a first amount of force during enrollment and with a different second amount of force during matching. The second amount of force can produce a change in one or more ridges in the fingerprint compared to the same ridges captured with the first amount of force.

Figures 8, 10, 11:
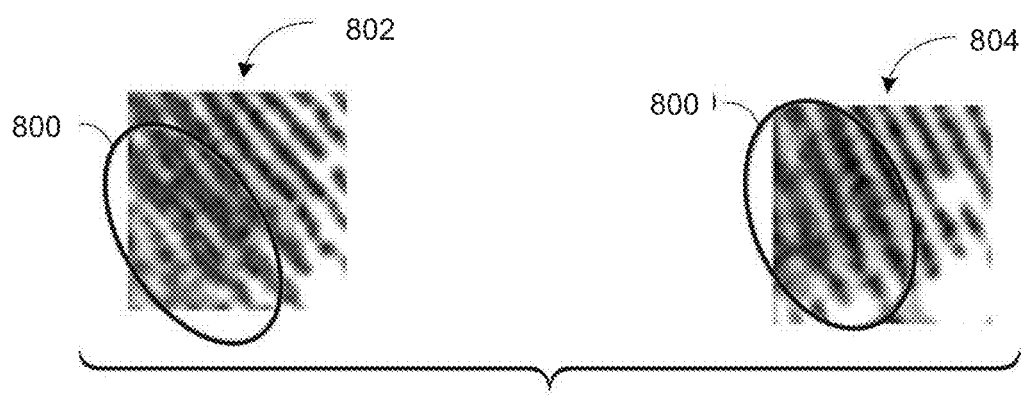
FIG. 8 illustrates changes in a fingerprint pattern.
FIG. 10 depicts a difference map.
FIG. 11 illustrates a residual map.

FIG. 8 depicts changes in a fingerprint pattern. At least one ridge in area 800 in a first fingerprint pattern 802 differs from a corresponding ridge in area 800 in a subsequent second fingerprint pattern 804. For example, as shown in FIG. 8, one or more ridges in area 800 are thicker in fingerprint pattern 802 compared to fingerprint pattern 804. A pattern change can introduce a correlated change in the fingerprint, which may result in the angle differences becoming correlated. In other words, a change in a ridge can be spatially correlated along the ridge, and the differences between the ridge flow angles can be artificially increased when the angle differences are correlated. A lower match score can result and increase the probability that a fingerprint match will be falsely rejected. The artificial increase the ridge flow angle differences can be mitigated through de-correlation of the angle differences.

Additionally, different finger matches can have correlated differences in some situations. The spatial correlation can be higher in different finger matches than in the same finger match. To compensate for this spatial correlation, a correlation penalty can be included in the match score determination that can be based on the amount or extent of the detected spatial correlation.

Figure 9:
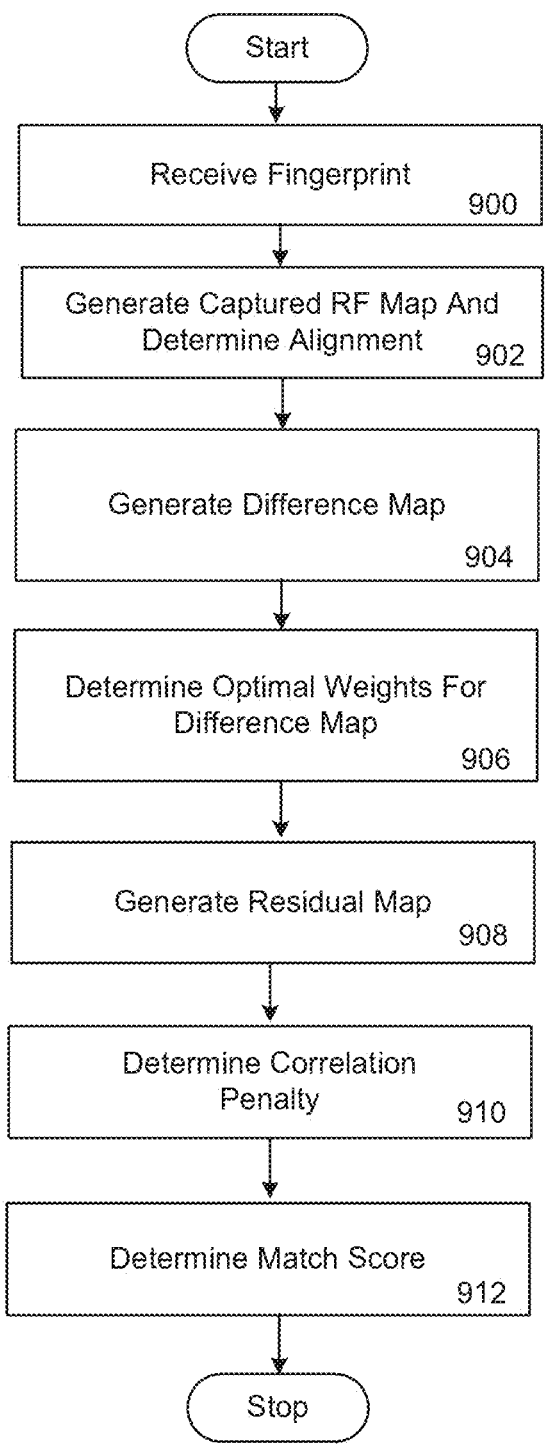
FIG. 9 is a flowchart of a method for processing a fingerprint as part of a fingerprint matching operation.

Referring now to FIG. 9, there is shown a flowchart of a method for processing a fingerprint as part of a fingerprint matching operation. Initially, a fingerprint image that has been captured by a fingerprint recognition device is received at block 900. A captured RF map is then generated and an alignment between the enrolled RF map the captured RF map determined at block 902. Next, a difference map is generated at block 904. One example of a difference map is illustrated in FIG. 10. The value $D_{ij}$ in each cell 1000 can be determined with the equation $D_{ij}=X_{ij}^E-X_{ij}^M$, where $X_{ij}^E$ and $X_{ij}^M$ represent corresponding angles in the enrolled RF map and the captured RF map, respectively.

One or more optimal weights for the difference map are then determined at block 906. The optimal weight or weights can be estimated on the fly by raster scanning the difference map and predicting each angle difference in a cell of the difference map based on previously scanned neighboring cells. Determination of the optimal weights is based on minimizing the error between the actual angle difference and the predicted angle difference. For example, the optimal weights can be determined to minimize the least squares error between the actual angle difference and the predicted angle difference.

In some embodiments, the one or more optimal weights are determined using a linear autoregressive model. The prediction of the angle difference for each cell in the difference map can be based on the equation $$P_{ij}=w_1 D_{i(j-1)}+w_2 D_{(i-1)(j-1)}+w_3 D_{(i-1)j}+w_4 D_{(i-1)(j+1)}, \quad \text{Equation 2}$$

where $w_1$, $w_2$, $w_3$, and $w_4$ represent the optimal weights and D represents the actual angle difference determined for four neighboring cells. For example, if the predicted angle difference is being determined for $D_{22}$ in FIG. 10, Equation 2 is $P_{22}=w_1 D_{21}+w_2 D_{11}+w_3 D_{12}+w_4 D_{13}$. Thus, the predicted angle difference for cell 22 considers the actual angle difference in the immediately adjacent cell in the same row and the actual angle differences in three adjacent cells in the immediately preceding row.

Equation 2 for the next raster scanned cell $D_{23}$ would be $P_{23}=w_1 D_{22}+w_2 D_{12}+W_3 D_{13}+w_4 D_{14}$. As discussed earlier, the weights $w_1$, $w_2$, $w_3$, and $w_4$ are determined such that the errors between the actual angle differences and the predicted angle differences are minimized. Thus, $w_1$, $w_2$, $w_3$, and $w_4$ can apply to an entire difference map. Multiple difference maps can have different weights $w_1$, $w_2$, $w_3$, and $w_4$.

Next, as shown in block 908, a residual map is generated based on the differences between the actual and predicted angle differences. One example of a residual map is illustrated in FIG. 11. The value $R_{ij}$ in each cell 1100 can be determined with the equation $R_{ij}=D_{ij}-P_{ij}$, where $D_{ij}$ represents the actual angle difference in the difference map and $P_{ij}$ represents the predicted angle difference calculated with Equation 2.

A correlation penalty can then be determined at block 910. The correlation penalty may be based on the amount of detected spatial correlation observed in the data. In one embodiment, the correlation penalty can be determined by grouping $P_{ij}$ into two categories depending on whether or not $P_{ij}$ reduces $|X_{ij}^E-X_{ij}^M|$. In other words, the category for $P_{ij}$ can be determined based on whether or not $P_{ij}$ produces a residual value that is less than the actual angle difference ($|R_{ij}|<|D_{ij}|$). A value for a correlation penalty B may then be determined based on the equation $B=L*(Q^+Q^-)$, where $Q^+$ and $Q^-$ are the sums of the absolute values of $|D_{ij}|-|R_{ij}|$ depending on whether or not $D_{ij}|>|R_{ij}|$, respectively. The value L can be determined empirically. The amount of spatial correlation in the angle differences can be adjusted by changing the value of L when determining the correlation penalty.

A match score may then be determined at block 912. The correlation penalty can be subtracted from the results that are based on the information content in the enrolled and captured RF maps, and the difference between corresponding ridge flow angles in the enrolled and captured RF maps. The method can end after the match score is determined.

Other embodiments can perform the method shown in FIG. 9 differently. The blocks can be performed in a different order, new blocks can be added, and/or some blocks can be omitted. For example, in some embodiments block 910 is omitted because a correlation penalty is not determined in those embodiments.

Although Equation 2 includes the four neighboring cells, other embodiments are not limited to this implementation. Any number of previously-visited neighboring cells can be included in the analysis. Additionally or alternatively, the previously-visited neighboring cells do not have to be limited to adjacent cells (e.g., the same row and/or immediately preceding row). And in some embodiments, the optimal weights can be determined for two or more regions of a difference map rather than for the entire difference map. For example, a difference map can be divided into four regions and one or more optimal weights can be determined for each region.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. An electronic device, comprising:
 a fingerprint recognition device for capturing a fingerprint image; and
 a processing device operatively connected to the fingerprint recognition device and adapted to raster scan a ridge flow map associated with the captured fingerprint image and determine one or more optimal weights for the ridge flow map, wherein:
 the one or more optimal weights are based on a prediction of a ridge flow angle for each cell in the ridge flow map using an actual ridge flow angle in one or more previously-scanned neighboring cells; and the processing device is adapted to perform an autoregressive modeling of the actual ridge flow angles in the ridge flow map.

2. The electronic device as in claim 1, further comprising a memory operatively connected to the processing device for storing one or more ridge flow maps.

3. The electronic device as in claim 1, wherein the processing device is adapted to determine the one or more optimal weights for the ridge flow map based on minimizing, for each ridge flow in at least a portion of the ridge flow map, an error between an actual angle of a ridge flow and a predicted angle of the ridge flow.

4. The electronic device as in claim 3, wherein the processing device is adapted to determine the one or more optimal weights for the at least a portion of the ridge flow map to minimize a least squares error between the actual and predicted angles of the ridge flow.

5. The electronic device as in claim 1, wherein, to determine the one or more optimal weights for the ridge flow map associated with the captured fingerprint image, the processing device is adapted to:
  determine a residual map based on differences between each actual and predicted angle in the ridge flow map using the one or more optimal weights; and
  determine entropy of the residual map.

6. A method for processing a fingerprint captured by a fingerprint recognition device, the method comprising:
  generating a ridge flow map based on a captured fingerprint image;
  raster scanning the ridge flow map;
  determining one or more optimal weights for the ridge flow map based on predicting a ridge flow angle for each cell in the ridge flow map using an actual ridge flow angle in one or more previously-scanned neighboring cells; and
  determining a residual map based on differences between each actual and predicted angle in the ridge flow map using the one or more optimal weights; and
  determining entropy of the residual map.

7. The method as in claim 6, wherein the one or more previously-scanned neighboring cells comprise at least one neighboring cell in a same row.

8. The method as in claim 6, wherein the one or more previously-scanned neighboring cells comprise at least one neighboring cell in an immediately preceding row.

9. The method as in claim 6, wherein the one or more optimal weights are determined so as to minimize error between the predicted and actual ridge flow angles.

10. A method for processing a fingerprint captured by a fingerprint recognition device, the method comprising:
  aligning a captured ridge flow map with an enrolled ridge flow map, wherein the captured ridge flow map is based on the captured fingerprint;
  estimating entropy for the captured ridge flow map, wherein estimating the entropy comprises:
    determining one or more optimal weights for the captured ridge flow map by:
      raster scanning the captured ridge flow map;
      predicting an angle in each cell of the captured ridge flow map based on an actual ridge flow angle in one or more previously-scanned neighboring cells;
      determining a first residual map based on differences between each actual and predicted angle of the captured ridge flow map using the one or more optimal weights; and
      determining entropy of the first residual map; and
  estimating entropy for the enrolled ridge flow map, wherein estimating the entropy comprises:
    determining one or more optimal weights for the enrolled ridge flow map by:
      raster scanning the enrolled ridge flow map;
      predicting an angle in each cell of the enrolled ridge flow map based on an actual ridge flow angle in one or more previously-scanned neighboring cells;
      determining a second residual map based on differences between each actual and predicted angle using the one or more optimal weights; and
      determining entropy of the second residual map.

11. The method as in claim 10, further comprising:
  generating a difference map based on the enrolled and captured ridge flow maps; and
  determining a match score that estimates a degree of similarity between the captured and enrolled ridge flow maps.

12. The method as in claim 11, wherein the difference map comprises angle differences between the enrolled ridge flow map and the captured ridge flow map.

13. The method as in claim 10, wherein the one or more optimal weights for the captured ridge flow map minimize errors between actual angles and predicted angles of the captured ridge flow map.

14. The method as in claim 13, wherein the one or more optimal weights for the captured ridge flow map minimize a least squares error between the actual and predicted angles.

15. The method as in claim 10, wherein the one or more previously-scanned neighboring cells in the enrolled ridge flow map and in the captured ridge flow map comprise at least one neighboring cell in a same row.

16. The method as in claim 10, wherein the one or more previously-scanned neighboring cells in the enrolled ridge flow map and in the captured ridge flow map comprise at least one neighboring cell in an immediately preceding row.

17. The method as in claim 10, wherein predicting an angle in each cell of the captured ridge flow map based on an actual ridge flow angle in one or more previously-scanned neighboring cells comprises performing an autoregressive modeling of the actual ridge flow angles in the captured ridge flow map.

* * * * *